Oct. 22, 1935.                H. WEICHSEL                2,018,336
                    ELECTRIC POWER TRANSMISSION APPARATUS
                    Filed Dec. 7, 1931            2 Sheets-Sheet 1

Inventor
H. WEICHSEL
By E. E. Hufoway
Att'y.

Oct. 22, 1935.  H. WEICHSEL  2,018,336
ELECTRIC POWER TRANSMISSION APPARATUS
Filed Dec. 7, 1931  2 Sheets-Sheet 2
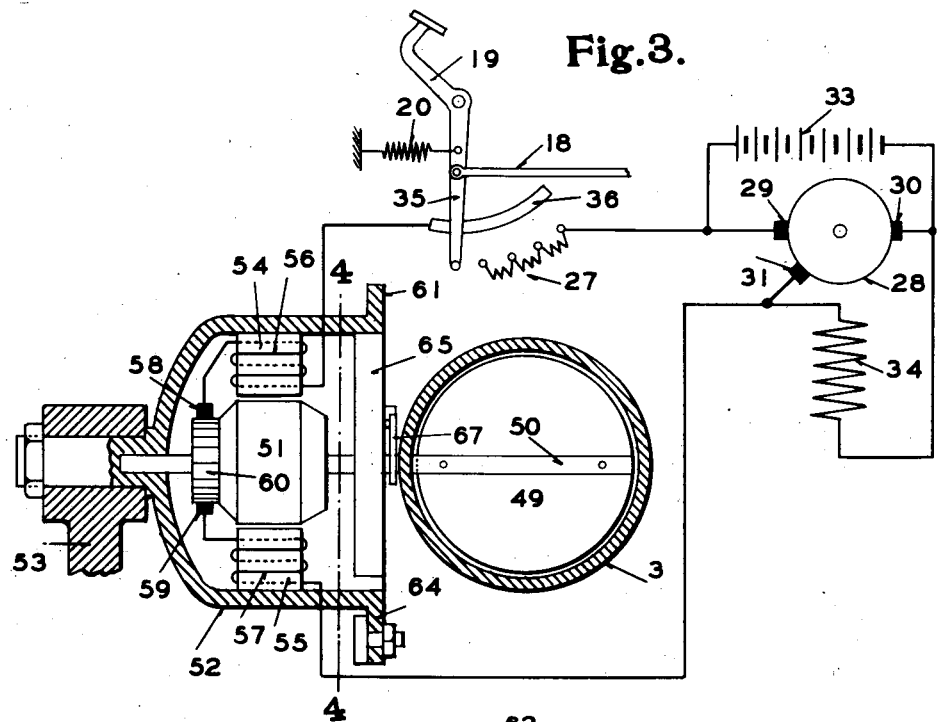
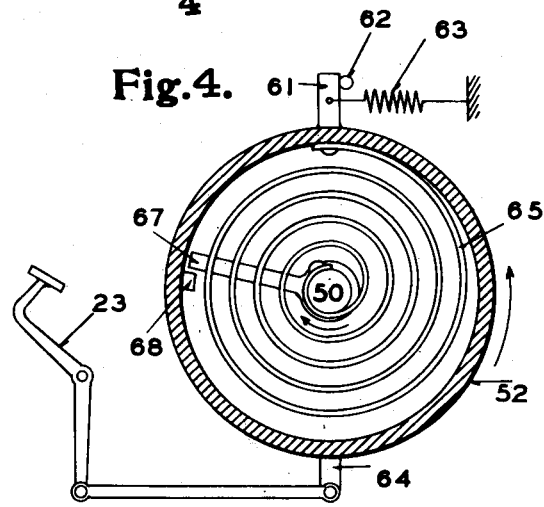
Inventor
H. WEICHSEL
By  E. Huffman
Att'y.

Patented Oct. 22, 1935

2,018,336

UNITED STATES PATENT OFFICE 2,018,336

ELECTRIC POWER TRANSMISSION APPARATUS

Hans Weichsel, St. Louis, Mo., assignor to Wagner Electric Corporation, St. Louis, Mo., a corporation of Delaware Application December 7, 1931, Serial No. 579,437

16 Claims. (Cl. 290—17)

My invention relates to variable ratio electric transmission for motor vehicles, especially to that type of such transmission which comprises two electrically and mechanically connected dynamo electric machines interposed between the source of power and the propeller shaft of the vehicle, one of such machines being provided with manually shiftable brushes whereby it may be caused to act either as a motor or as a generator; its torque per ampere varied when operating as a motor; and its output as a generator varied.

One of the objects of my invention is to produce a control means for the type of transmission referred to, whereby the operator can change the torque ratio between the propeller shaft and the engine shaft at will and at any time by the simple operation of a lever which is so arranged that when not operated, the ratio of propeller torque to engine torque is at its smallest value.

Another object of my invention is to automatically vary the fuel supply of the engine by means jointly controlled by the brush shifting mechanism and by the engine speed.

Still another object of my invention is to so relate the mechanical brake applying mechanism of the vehicle with the dynamic brake of the electrical transmission that the latter may be operated either individually or simultaneously with the mechanical brake by movement of the mechanical brake applying mechanism.

Figure 1:
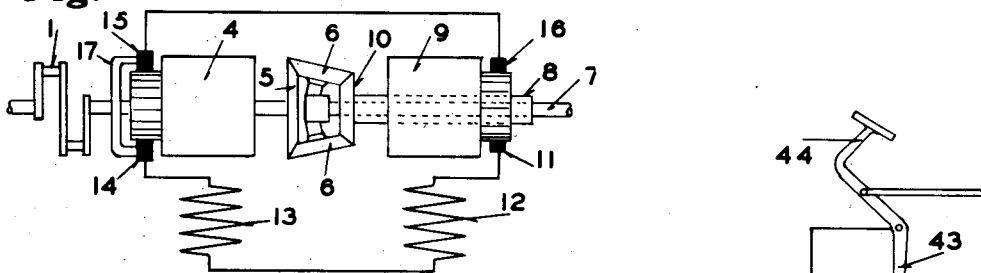
Figure 2:
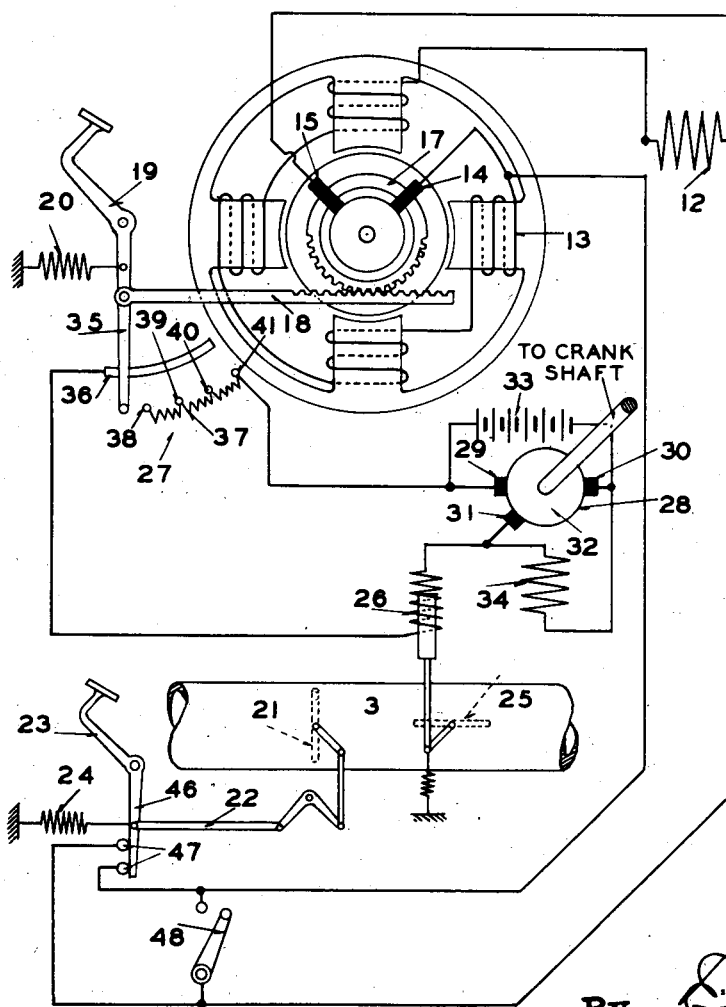

Other objects of my invention will become apparent from the following description taken in connection with the accompanying drawings in which Figure 1 is a diagrammatic representation of the apparatus and circuits of an electrical transmission of the type to which my invention is applicable; Figure 2 is a diagrammatic representation of the electrical elements of the transmission shown in Figure 1 and of brush shifting, engine control, and braking means embodying my invention; Figure 3 is a view of a modified form of means for controlling the fuel supply to the engine; and Figure 4 is a cross sectional view on the line 4—4 of Figure 3.

Referring to Figures 1 and 2 in detail, 1 indicates the crank shaft of an internal combustion engine, the fuel supply pipe 3 of the engine being indicated in Figure 2. The crank shaft is connected to the armature 4 of a dynamo-electric machine hereinafter referred to as a "booster" dynamo. The armature 4 has secured to it a bevel gear 5 which engages a pair of bevel gears 6 rotatable on short shafts extending from a propeller shaft 7 which in turn is connected in the usual manner to the wheels of the vehicle. A hollow shaft 8, rotatable on the driven shaft, has secured to it an armature 9 of a second dynamoelectric machine hereinafter referred to as a "clutch" dynamo. Secured to the clutch dynamo is a bevel gear 10 in engagement with the bevel gears 6, the gear structure described constituting an epicyclic gearing connecting the engine shaft and clutch dynamo to the propeller shaft. The armatures and fields of the booster dynamo and clutch dynamo are all connected in series.

The brushes 14 and 15 of the booster dynamo are fixed to a ring 17 provided with gear teeth engaged by a rack 18. The rack 18 is connected to a pedal 19 whereby the brushes may be shifted through 180 electrical degrees, causing the booster dynamo to act as a motor or as a generator and its torque as a motor and its output as a generator may be varied. A spring 20 is adapted to normally bias the brushes to full generating position.

The operation of the apparatus so far described is as follows: The engine is started and armature 4 of the booster dynamo will be rotated with the crank shaft, and the armature 9 of the clutch dynamo will rotate in the opposite direction on the driven shaft 7 at a speed depending on the ratio of the gears 5, 6 and 10. Due to the load on shaft 7 imposed by the vehicle, it will remain stationary. Field short circuiting means to be later described, is also provided to prevent the engine from stalling under these conditions.

To start the vehicle the operator will first fully depress the pedal 19, thus placing brushes 14 and 15 in "full" motor position, and then will open the engine throttle to a selected extent. As the engine speeds up, the clutch dynamo will operate as a generator and deliver current to the booster dynamo. A torque opposing the rotation of the clutch dynamo armature will be impressed upon the gears 6 connected to the propeller shaft. Since the booster dynamo then acts as a motor, the torque it produces, due to the current delivered by the clutch dynamo, is added to the engine torque. As the output of the clutch dynamo increases, the torque applied to the propeller shaft continues to increase until a value is reached sufficient to start the vehicle, and when a particular ratio of propeller shaft speed to engine shaft speed is attained (this ratio being determined by the gear ratios employed), the clutch dynamo armature will become stationary. This condition will not be reached, however, while the brushes 14 and 15 are in motor position. When the vehicle has attained a speed which the operator has learned from experience to be sufficient for him to do so, he will either remove his foot from the pedal 19, thus allowing the spring 20 to bring the brushes immediately to full generating position, or will cause this action to be gradual. When the brushes of the booster dynamo are in full generating position, the electrical machines and the gearing described establish a connection between the engine and the propeller shaft which is comparable to "direct drive", as known in mechanical transmissions, assuming, of course, that the clutch dynamo and the booster dynamo are approximately the same size.

When the brushes of the booster dynamo are in generating position, the machine produces an E. M. F. opposing the E. M. F. produced by the clutch generator if the speed of the propeller shaft is below the definite ratio to engine speed heretofore mentioned, which has the effect of increasing the load on the generators and, therefore, increasing the torque applied to the propeller shaft. The speed of the vehicle will, therefore, continue to accelerate until the ratio referred to has been attained and the clutch dynamo armature becomes stationary, whereupon the current delivered by the booster dynamo will cause the clutch dynamo to operate as a motor whose direction of rotation will be the same as the booster dynamo. Assuming that the engine throttle opening has not been changed and the vehicle is moving on a level, or on a constant upgrade, the speed of the vehicle will thus continue to increase to the maximum value maintainable by the engine torque. Further increase of vehicle speed will, therefore, be attained only by further opening of the engine throttle.

From the preceding description it will be apparent that the operator of the vehicle will determine when to release the the booster armature brushes, to allow them to move from motor to generator position, by the speed of the vehicle and that he may make the change at any point in the speed range which he considers suitable, in the same manner as if the vehicle were provided with the usual gear shift mechanical transmission. In other words, the minimum speed at which the shift may be made is that from which the engine will be capable of accelerating the vehicle under the new torque ratio conditions established. And it may be here pointed out that each position of the shiftable brushes 14 and 15 throughout their entire range of movement, establishes a different and definite torque ratio between the engine and the propeller shaft. Thus, when a vehicle starts to ascend a grade at a speed of forty miles per hour, for example, and it is desired to maintain this speed but the operator finds that it cannot be maintained with the engine throttle wide open and the brushes in full generating position, he will simply depress pedal 19 to move the brushes backwardly sufficient to establish the torque ratio between the engine and the propeller shaft which will permit the engine to maintain the selected speed, if within its maximum capacity.

It will be apparent from the foregoing description that an operator could so manipulate the control mechanism as thus far described, as to cause the engine to attain an excessive speed,— for example, by placing the throttle in full open position when the brushes are in full motor position and comparatively little torque is required to start or accelerate the vehicle. To prevent the racing of the engine just referred to, I have provided additional control means now to be described.

The fuel pipe 3 for the engine is shown as provided with the usual valve 21 controlled through the linkage 22 by the accelerator pedal 23, normally biased by spring 24 to close the valve. The pipe 3 is also provided with a second valve 25 which is controlled by an electro dynamic device shown as a solenoid 26, although other types may be used as for instance, a "torque" motor. The valve 25 is biased by a suitable spring to open position. This solenoid is connected in series with a variable resistance 27 and a generator 28. The generator is of the "third brush" type having two main brushes 29 and 30 and a third brush 31. The armature 32 of the generator is preferably connected to the engine shaft 1 but it also may be connected to the driven shaft 7 if desired. The generator is of well known type and produces increased voltage across the brushes 29 and 31 upon increased speed of the armature. The battery 33 is connected to the brushes 29 and 30 and the field 34 of the generator is connected across the brushes 30 and 31. The brush 31 is connected to the solenoid and the brush 29 is connected to the variable resistance so that the voltage in the circuit will vary with the speed of the generator armature.

The pedal 19 is provided with an extension 35 which is in continuous engagement with a contact member 36 connected to the solenoid. The resistance 27 consists of a resistance coil 37 provided with a plurality of taps 38, 39, 40 and 41 adapted to cooperate with the pedal extension 35. The extension 35 is free from contact with any of the taps when the pedal is biased by the spring 20 to the position shown. A maximum amount of resistance is inserted in the solenoid circuit when the extension is in contact with the tap 38 and a minimum when the extension is in contact with tap 41.

The operation of the control means, in conjunction with the operation of the transmission, is as follows: The operator having depressed pedal 19 and shifted the brushes to motor position to start the vehicle, the extension 35 is placed on the tap 41, thereby decreasing the resistance in the solenoid circuit to a minimum. The accelerator pedal 23 has also been depressed and the valve 21 completely opened to increase the speed of the engine. As previously stated, the transmission now operates to start the vehicle under the torque ratio between the engine and the propeller shafts determined by the position of the brushes. The speed of the engine at this time, however, is not great enough to cause the generator to energize the solenoid sufficiently to move the valve 25. As the vehicle speeds up, the engine speed will also increase, which will cause the "third brush" generator voltage to increase and operate the solenoid to close the valve 25 and thereby prevent the engine from reaching an excessively high speed.

As the sped of the vehicle approaches a constant speed, the operator gradually releases the pedal 19, thereby shifting the brushes 14 and 15 toward generator position. This position of the pedal 19 will increase the resistance of the solenoid circuit and allow the valve 25 to open, thereby increasing the speed of the engine since it is assumed that the valve 21 remains in complete open position. The increased speed of the engine is insufficient to cause the generator to supply sufficient added voltage to close the valve 25 as far as it was when the pedal 19 was fully depressed, due to the added resistance in the solenoid circuit. The speed of the engine of this intermediate position of pedal 19 is, therefore, limited to a value conforming with the torque ratio between the engine and the propeller shaft as determined by the new position of the brushes.

When the pedal is fully released and the brushes 14 and 15 are biased in full generator position, the solenoid circuit is opened and, therefore, the valve 25 is in full open position, as well as the valve 21. The dynamoelectric machines are at this time both rotating at the same speed and a one to one ratio drive is transmitted from the driving shaft to the driven shaft. The speed of the engine under these conditions is in no way limited by the valve 25 and the operator can control the speed of the vehicle by controlling only the valve 21, as is the usual operation in the present day vehicle.

When a hill is encountered and the vehicle slows down, the operator need only depress the pedal 19 to increase the torque ratio between the engine and the propeller shafts and the maximum proper engine speed automatically results without manipulating the accelerator pedal 23. It is thus seen that by the use of my novel control means there is no danger of excessive engine speeds for a given torque ratio between the shafts, thereby preventing excessive wear on the engine and excessive fuel consumption.

I have also combined with my electrical transmission and control therefor, an electric brake that will be operative in conjunction with the brake pedal of the mechanical or hydraulic wheel brake with which the vehicle is equipped. A resistance 42 and a switch are connected in series with brushes 11 and 16 of the clutch dynamo armature. The switch is shown as the knife type, the movable contact 43 therefor being connected to the usual brake pedal 44 and the fixed contact 45 comprising a pair of spring members between which the movable contact 43 is received. In the normal released position of the brake pedal the switch is open, but the contact members are so spaced from each other that they will come into engagement before the mechanical or hydraulic brakes are applied.

To apply the electrical brakes, the operator need only release pedal 19 to place the brushes 14 and 15 in generator position and then depress the brake pedal sufficiently to close the contacts 43 and 45. The booster dynamo now acts as a generator and by its current it excites field 12 of the clutch dynamo. The excitation of the field 12 by the booster dynamo causes an E. M. F. in the clutch dynamo armature 9 which bucks the E. M. F. of the booster dynamo and produces a flow of current through the resistance 42. As soon as the flow of current through the resistance is greater than that produced by the booster dynamo, the clutch dynamo will act as a generator. The combined generator action of the booster and clutch dynamos produces a braking effect on the driven shaft. If the operator desires to use his mechanical brakes in addition to the electrical brake, he need only move the brake pedal farther forward.

The accelerator pedal 23 is provided with an extension 46 that is adapted to act as the movable contact member of a switch 47. This switch is connected in parallel with the field 12 of the clutch and field 13 of the booster, whereby the fields may be short-circuited when the switch is closed and the accelerator pedal is in position to close the valve 21 and allow the engine to idle. By short-circuiting the fields 12 and 13 when the engine is idling, it is impossible for the clutch dynamo to transmit any torque to the driven shaft and, therefore, the transmission will be in a "neutral" position. I also provide a manual switch 48 for short-circuiting the fields 12 and 13 so that the operator may, when the switch is closed, "warm up" the engine at will without transmitting any torque to the driven shaft.

In some types of engines it may be impossible or undesirable to use two throttle valves in the fuel supply pipe and I, therefore, have devised means, as disclosed in Figures 3 and 4, whereby it is possible to secure the same results with only one valve. The single valve 49 in the fuel supply pipe 3 is carried by a shaft 50 which extends to the outside of the pipe and has secured thereto the armature 51 of a small "torque" motor. The armature is surrounded by a frame member 52 journaled in a fixed support 53. The frame member carries the poles 54 and 55 which are surrounded by the field windings 56 and 57 connected in series with the armature 51 by means of brushes 58 and 59 and commutator 60. The "torque" motor is connected in series with the generator 28 and the variable resistance 27 in the same manner as solenoid 26 (Figure 2). The frame member is provided with a projection 61 which is biased against a stop 62 by means of a spring 63 (Figure 4). The frame member is also provided with an arm 64 for connection with the accelerator pedal 23. A spiral spring 65 is connected to the shaft 50 and the frame 52 for positioning the valve 49 in closed position when the projection 61 is in engagement with the stop 62. To insure that the spring 65 does not move the shaft 50 and the valve beyond the closed position, the shaft 50 is provided with an arm 67 cooperating with a stop 68 on the frame member.

In operation of the modified control it is assumed that the armature and field of the torque motor are so connected that a flow of current causes the armature to rotate the shaft 50 in a clockwise direction. The accelerator pedal 23 connected to the arm 64 of the frame is adapted to move the frame 52 in a counter-clockwise direction when the pedal is depressed and if there is no torque applied to shaft 50 by the "torque" motor, the valve 49 can be controlled solely by the pedal 23. When the operator starts the vehicle the pedals 19 and 23 are both depressed and the valve 49 is fully opened. When the vehicle has reached a given speed the generator 28 will produce a sufficient current to cause the armature 51 to move clockwise and wind up the spiral spring and thereby partially close the valve 49 in the same manner as the solenoid operates the valve 25 in Figure 2. It is thus seen that the fuel supply to the engine is controlled by the single valve 49 in the same manner as when the two valves 21 and 25 were used.

Having fully described my invention, what I claim as new and desire to secure by Letters Patent of the United States is:

1. In apparatus of the class described, the combination of an engine, a driving shaft operated thereby, a driven shaft, a pair of dynamoelectric machines for transmitting power from the driving shaft to the driven shaft, one of the dynamoelectric machines being provided with shiftable brushes whereby the machine may be caused to act as a motor or as a generator, means responsive to the speed of one of the shafts for controlling the speed of the engine, and means for disabling said last named means when the shiftable brushes are in full generator position.

2. In apparatus of the class described, the combination of an engine, a driving shaft operated thereby, a driven shaft, a pair of dynamoelectric machines for transmitting power from the driving shaft to the driven shaft, one of the dynamoelectric machines being provided with shiftable brushes whereby the machine may be caused to act as a motor or as a generator, and means jointly controlled by the speed of one of the shafts and the position of the brushes for controlling the speed of the engine.

3. In apparatus of the class described, the combination of an engine, a driven shaft, electrical means for transmitting power from the engine to the driven shaft, said means comprising a dynamoelectric machine and means whereby said machine may be caused to act as a motor or as a generator, and automatic means controlled by the speed of one of the shafts for limiting the speed of the engine when said last named dynamoelectric machine is acting as a motor, said last named means including a generator driven by the engine.

4. In apparatus of the class described, the combination of an engine, a driven shaft, electrical means for transmitting power from the engine to the driven shaft, said means comprising a dynamoelectric machine and means whereby said machine may be caused to act as a motor or as a generator, automatic means controlled by the speed of one of the shafts for limiting the speed of the engine when said last named dynamoelectric machine is acting as a motor, and means for disabling said automatic means when said machine acts as a full generator.

5. In apparatus of the class described, the combination of an engine, a driving shaft operated thereby, a driven shaft, a pair of dynamoelectric machines for transmitting power from the driving shaft to the driven shaft, one of said dynamoelectric machines being provided with shiftable brushes whereby the machine may be caused to act as a motor or as a generator, means for shifting the brushes, and means controlled by the brush shifting means for limiting the speed of the engine.

6. In apparatus of the class described, the combination of an engine, a driving shaft operated thereby, a driven shaft, a pair of dynamoelectric machines for transmitting power from the driving shaft to the driven shaft, one of the dynamoelectric machines being provided with shiftable brushes whereby the machine may be caused to act as a motor or as a generator, manual means for controlling the speed of the engine, and means jointly controlled by the speed of one of the shafts and the position of the brushes for limiting the speed of the engine.

7. In apparatus of the class described, the combination of an engine, a driving shaft operated thereby, a driven shaft, a pair of dynamoelectric machines for transmitting power from the driving shaft to the driven shaft, one of the dynamoelectric machines being provided with manually shiftable brushes whereby the machine may be caused to act as a motor or as a generator, means biasing the brushes to full generator position, and means jointly controlled by the speed of one of the shafts and the position of the brushes for controlling the speed of the engine, said means being inoperative when the brushes are in full generator position.

8. In apparatus of the class described, the combination of an engine, a driving shaft operated thereby, a driven shaft, a pair of dynamoelectric machines for transmitting power from the driving shaft to the driven shaft, one of the dynamoelectric machines being provided with manually shiftable brushes whereby the machine may be caused to act as a motor or as a generator, means biasing the brushes to full generator position, manual means for controlling the speed of the engine, and means jointly controlled by the speed of one of the shafts and the position of the brushes for limiting the speed of the engine, said means being inoperative when the brushes are in full generator position.

9. In apparatus of the class described, the combination of an internal combustion engine, a driving shaft, a driven shaft, a pair of dynamoelectric machines for transmitting power from the driving shaft to the driven shaft, one of the dynamoelectric machines being provided with shiftable brushes whereby the machine may be caused to act as a motor or as a generator, manual means for shifting the brushes, means biasing the brushes to generator position, and means independent of the manual means for causing the other dynamoelectric machine to act as a generator to produce a braking effect on the driven shaft.

10. In apparatus of the class described, the combination of an engine, a driven shaft, a pair of dynamoelectric machines for transmitting power from the engine to the driven shaft, one of said dynamoelectric machines being provided with shiftable brushes whereby the machine may be caused to act as a motor or as a generator, a valve controlling the fuel supply to the engine, electromagnetic means for operating the valve, a generator and a variable resistance in series with said electromagnetic means, and means for shifting said brushes and varying the resistance.

11. In apparatus of the class described, the combination of an engine, a driving shaft operated thereby, a driven shaft, a pair of dynamoelectric machines for transmitting power from the driving shaft to the driven shaft, one of said machines being provided with shiftable brushes whereby the machine may be caused to act as a motor or as a generator, a manually operable valve for controlling the fuel supply to the engine, means jointly controlled by the position of the brushes and the speed of one of the shafts for limiting the fuel supplied to the engine by the valve, said means comprising a second valve, electromagnetic means for operating the second valve, a variable voltage generator driven from one of said shafts and in series connection with the electromagnetic means, and means for varying the resistance of the circuit in accordance with the position of the brushes.

12. In apparatus of the class described, the combination of an engine, a driving shaft operated thereby, a driven shaft, electrical means for transmitting power from the driving shaft to the driven shaft and comprising a dynamoelectric machine provided with shiftable brushes whereby the machine may be caused to act as a motor or as a generator, a valve controlling the fuel supply to the engine, a rotatable member for actuating the valve, yieldable means between the valve and the member for normally maintaining said valve and member in a predetermined relative position, and means jointly controlled by the speed of one of the shafts and the position of the brushes for modifying the relative position of the valve and the rotatable member.

13. In apparatus of the class described, the combination of an engine, a driving shaft operated thereby, a driven shaft, electrical means for transmitting power from the driving shaft to the driven shaft and comprising a dynamoelectric machine provided with shiftable brushes whereby the machine may be caused to act as a motor or as a generator, a valve controlling the fuel supplied to the engine, a rotatable member for actuating the valve, yieldable means between the valve and the member for normally maintaining said valve and member in a predetermined relative position, means jointly controlled by the speed of one of the shafts and the position of the brushes for modifying the relative position of the valve and the rotatable member, said means comprising electromagnetic means connected to said valve, a generator connected to one of the shafts and in series with the electromagnetic means, and means for varying the resistance of the circuit in accordance with the position of the brushes.

14. In apparatus of the class described, the combination of an engine, a driving shaft operated thereby, a driven shaft, a pair of dynamoelectric machines for transmitting power from the driving shaft to the driven shaft, one of said machines being provided with shiftable brushes whereby the machine may be caused to act as a motor or as a generator, a manually operable valve for controlling the fuel supplied to the engine, means jointly controlled by the position of the brushes and the speed of one of the shafts for limiting the fuel supplied to the engine by the valve, said means comprising a second valve, electromagnetic means for operating the second valve, a variable voltage generator driven from one of said shafts and in series connection with the electromagnetic means, and means for varying the current in the circuit in accordance with the position of the brushes.

15. In apparatus of the class described, the combination of an engine, a driving shaft operated thereby, a driven shaft, a pair of dynamoelectric machines for transmitting power from the driving shaft to the driven shaft, one of said dynamoelectric machines being provided with shiftable brushes whereby the machine may be caused to act as a motor or as a generator, means for shifting the brushes, and means controlled by the brush shifting means for limiting the speed of the engine, said last named means being inoperative when the brushes are in full generator position.

16. In apparatus of the class described, the combination of an internal combustion engine, a driving shaft, a driven shaft, a pair of dynamoelectric machines for transmitting power from the driving shaft to the driven shaft, one of the dynamoelectric machines being provided with shiftable brushes whereby the machine may be caused to act as a motor or as a generator, manual means for shifting the brushes, means biasing the brushes to generator position, means for causing the other dynamoelectric machine to act as a generator to produce a braking effect on the driven shaft, a brake pedal for operating the wheel brakes of the vehicle, and means controlled by the brake pedal for operating said last named means.

HANS WEICHSEL.